(12) United States Patent
Corghi (10) Patent No.: US 8,776,858 B2
(45) Date of Patent: Jul. 15, 2014

(54) APPARATUS AND METHOD FOR MOUNTING AND REMOVING TYRES ON AND FROM RESPECTIVE WHEEL RIMS

(75) Inventor: Giulio Corghi, Correggio (IT)

(73) Assignee: Corghi S.p.A., Correggio (IT)

( * ) Notice: Subject to any disclaimer, the term of this patent is extended or adjusted under 35 U.S.C. 154(b) by 721 days.

(21) Appl. No.: 12/917,093

(22) Filed: Nov. 1, 2010

(65) Prior Publication Data

US 2011/0100558 A1  May 5, 2011

(30) Foreign Application Priority Data

Nov. 5, 2009 (IT) .............................. B02009A0729

(51) Int. Cl.
*B60C 25/00* (2006.01)
(52) U.S. Cl.
USPC ................ 157/1.1; 157/14; 157/1.24; 73/462
(58) Field of Classification Search
USPC ................. 157/1.1–1.3; 254/120, 131, 131.5; 73/146
See application file for complete search history.

(56) References Cited

U.S. PATENT DOCUMENTS

| 4,956,995 | A | * | 9/1990 | Harrold et al. ................... 73/146 |
| 5,083,457 | A | * | 1/1992 | Schultz ........................ 73/146.5 |
| 5,385,045 | A | | 1/1995 | Mannen et al. |
| 6,234,232 | B1 | * | 5/2001 | Kane et al. .................... 157/1.24 |
| 8,250,915 | B1 | * | 8/2012 | Voeller et al. ................... 73/460 |
| 2003/0084977 | A1 | | 5/2003 | Gonzaga |
| 2005/0155719 | A1 | | 7/2005 | Gonzaga |
| 2007/0006976 | A1 | | 1/2007 | Gonzaga |

FOREIGN PATENT DOCUMENTS

| CN | 2188045 Y | 1/1995 |
| DE | 42 02 803 C1 | 7/1993 |
| DE | 43 23 549 A1 | 1/1994 |
| EP | 1207061 A2 | 5/2002 |
| EP | 1 479 538 A2 | 11/2004 |
| IT | 1274552 A1 | 5/1995 |
| IT | 1263799 B | 8/1996 |

* cited by examiner

*Primary Examiner* — Lee D Wilson
*Assistant Examiner* — Melanie Alexander
(74) *Attorney, Agent, or Firm* — Pearne & Gordon LLP

(57) ABSTRACT

An apparatus (1) for mounting and removing a tire (2) on and from a respective rim (3) comprises: a movement element (9) for moving a bead (2a) of the tire (2) in order to insert/remove the bead (2a) into/from a respective groove in the rim (3); means (4) for supporting and moving the rim (3), designed to rotationally drive the rim about its longitudinal axis; characterized in that the means (4) for supporting and moving the rim (3) comprise a sensor (252) for measuring the mechanical strain applied to the supporting and movement means (4) as a result of the mechanical stress on the bead (2a) of the tire (2) during mounting/removal of the latter on/from the rim (3).

15 Claims, 6 Drawing Sheets

APPARATUS AND METHOD FOR MOUNTING AND REMOVING TYRES ON AND FROM RESPECTIVE WHEEL RIMS

BACKGROUND OF THE INVENTION

This invention relates to an apparatus and a method for mounting and removing tyres on and from respective wheel rims.

As is known, apparatuses for mounting and removing tyres on and from respective wheel rims are equipped with a rim supporting element that is suitably power driven to turn the rim during mounting or removal of the tyre.

Usually, the rim supporting element is positioned with its axis vertical (that is, directed substantially in the direction of application of the weight force) or, alternatively, with the axis horizontal.

It should be noted that this invention relates to machines for mounting (and removing) the tyres, without any limitation as to the orientation of the supporting element.

For brevity and simplicity, however, this description will refer to the case where the supporting element is positioned with its axis vertical in such a way as to turn the wheel about a longitudinal axis of rotation oriented along said vertical axis.

Above the supporting element, there is a set of tools designed to position the tyre bead (that is, the annular edge of the tyre) at predetermined positions on the rim.

It should be noted that a tyre has two beads, corresponding to the two annular ends (or edges) of the tyre itself.

Each bead has a head portion, oriented radially, and a lateral portion.

Prior art tools for mounting and removing tyres on and from wheel rims include, for example, a shaped element (for mounting) and a lever or a claw (for removing) which are designed to be inserted between the bead and the rim in such a way as to position the bead at a predetermined position relative to the rim, in particular to push a first portion of the bead between the annular outer edges of the rim at a respective groove (during mounting) or to extract the bead from the rim and keep it in an extracted position relative to the rim groove (during removal).

Next, the rim is turned about its longitudinal axis so that the tool (which is held still while the rim is rotated) slides along at least a part of the circumference of the bead in such a way as to prise the entire bead inwards (during mounting) or outwards (during removal) over the edge of the rim.

In addition, during mounting, a pressure disc is used to push a side wall of the tyre towards the opposite side wall.

During removal, on the other hand, the pressure disc is used to detach the tyre bead from the rim (in effect, during use, the tyre becomes very hot, causing the rubber to vulcanize, thereby making the bead adhere to the wheel rim). The bead pressure disc, connected to one end of an operating arm, is therefore also known as bead loosener.

The pressure disc may also be used as a further aid during tyre mounting.

For example, when mounting the tyre on the rim, the pressure disc (or bead loosener) is usually used to facilitate correct positioning of the bead relative to the rim.

When mounting very rigid or large tyres, a pivoting clamp known by the trade name of "Tucano" is also used. This clamp also holds the tyre bead in place relative to the rim so as to minimize tension during mounting operations (that is, the mechanical strain the tyre bead is subjected to while it is being fitted to the wheel rim).

The clamp consists of a gripper designed to hold the edge of the rim at a zone of the rim where the bead has already been pushed onto the rim. Under the gripper there is a flat part that presses the side wall of the tyre near the bead. This flat part is pivotally mounted so that it remains in contact with the tyre as the latter moves.

It should be noted that the rim forms a first and a second seat (in the form of annular grooves) for receiving a first and a second bead during use of the wheel. The seats are located at opposite lateral ends of the rim.

The rim also has an annular groove or channel running round the middle of it.

This annular groove is in the form of a recess designed to receive at least one portion of the tyre bead temporarily during mounting operations.

In effect, at least during an initial stage of the mounting operation, the axis of the tyre is inclined with respect to the axis of the rim. In this situation, a first portion of the bead (or rather, of one of the two beads) is on the outside of the rim, held by the mounting/removal tool, while a second portion of the same bead (the portion diametrically opposite it) is inside the rim channel, allowing the tyre to be moved in a direction perpendicular to the rim axis, towards the mounting/removing tool.

This, as is known, facilitates tyre mounting by reducing the mechanical strain the bead is subjected to.

In light of the above, the engagement tool consisting of the above mentioned clamp is designed to push one side of the tyre, close to the bead, so as to keep the bead inside the channel in the zone of the bead diametrically opposite the portion of the bead that interacts with the mounting/removing tool.

The clamp is used together with a rim guard fitted to the edge of the rim to prevent damage to the bead as it moves over the sharp edges of the rim.

In effect, when mounting the tyre on the rim, the bead is subjected to mechanical strain that often leads to tyre damage. That is because the bead is subjected to radial strain (bead compression), axial strain (bead lifting) and tangential strain (bead pulling, due to the frictional component). All these types of mechanical strain on the bead, if they exceed certain limits (specified by tyre manufacturing associations and automobile constructors) may lead to serious tyre damage.

In this regard, it must be stressed that the risk of damage to the bead is particularly serious if it occurs during mounting because, once the tyre has been mounted, the damage, if any, is not visible before the tyre is used.

Further, the problem is felt particularly strongly on account of the use of run flat tyres, that is, tyres designed to resist the effects of deflation. Thus, in the event of a failure, a long time might pass before the driver realizes the tyre is damaged.

In fact, tyre manufacturers now tend to make tyres harder and with the shoulder lower down: this worsens the problem of damage to the tyre during mounting and removal.

To overcome this drawback, sensors such as extensometers applied to the tool or to the bead loosener are used, as is known from patent document IT1274552.

However, this solution does not allow accurate and reliable measurement of the mechanical strain the tyre bead is subjected to during mounting and removal.

In effect, the solution makes it possible to measure only the strain that results in deformation of the tool (that is, of the bead loosener). A great deal of the strain applied the bead is subjected to, however, is absorbed by the elasticity of the tool mounting structures. Moreover, the flexibility of the tools is limited and variable in time.

Another technical solution is known from patent document IT1263799.

This solution relates to a tyre removing machine comprising a pair of arms located on opposite sides of the wheel and movable towards each other to abut the sidewalls of the tyre so as to detach the bead from the rim (in practice, the arms are used as two bead looseners).

In this solution, the arms are equipped with sensors (torque meters in general, extensometers in particular designed to measure the pressure applied by the arms to the sides of the tyre).

The pressure applied by the arms, however, is not converted into or referable to mechanical strain acting on the bead.

This solution cannot therefore be used to obtain really useful and effective information on the mechanical strain applied to the bead and potentially able to damage the bead.

A further technical solution concerning an apparatus for servicing tired wheel for motor vehicles is already known from document EP1479538.

In this solution, the apparatus comprises a rotatable motor-driven support for the positioning of the tired wheel. The rotatable support is connected to the motor by a mechanical clutch which is used to disconnect the rotatable support from the motor, automatically and mechanically, when a critical load value, consisting of the mechanical strains applied to the tired wheel for assembling or disassembling it, is reached.

Moreover, this solution comprises an encoder designed to control the angular position of the rotatable support so that the encoder defines a position sensor directed to verify when the clutch is operative.

However, also this solution does not allow accurate and reliable measurement of the mechanical strains the tyre bead is subjected to during mounting and removal, nor allows the monitoring of the trend of said strains.

SUMMARY OF THE INVENTION

In this context, the technical purpose which forms the basis of this invention is to propose an apparatus and a method for mounting and removing tyres on and from respective wheel rims and which overcome the above mentioned disadvantages.

In particular, this invention has for an aim to provide an especially reliable apparatus and method for mounting and removing tyres on and from respective wheel rims that enables to make available useful data to detect and possibly prevent cases of tyre bead damage.

Another aim of the invention is to provide an apparatus and method for mounting and removing tyres on and from respective wheel rims that makes it possible to mount and remove any tyre without the risk of damaging tyre beads.

The technical purpose and aims stated above are substantially achieved by an apparatus and method for mounting and removing tyres on and from respective wheel rims, comprising the technical features set out in one or more of the appended claims.

Thus, the apparatus and method according to the invention allow tyres to be mounted and removed on and from respective rims with the possibility of measuring the mechanical strain applied to the tyre bead while the latter is deformed so it can be coupled/uncoupled to/from the rim.

In particular, the apparatus according with the present invention comprises:

- a movement element for moving a bead of the tyre in order to insert/remove the bead into/from a respective groove in the rim;
- means for supporting and moving the rim, designed to rotationally drive the rim about its longitudinal axis.

According to the invention, the rim supporting and movement means comprise a sensor for measuring the mechanical strain applied to the supporting and movement means as a result of the mechanical stress the tyre bead is subjected to during tyre mounting and removal on and from the rim. Said sensor being configured to make available a signal representing the mechanical strain applied to the tyre bead during tyre mounting and removal on and from the rim.

Preferably, the apparatus according to the invention comprises an electronic control unit connected at least to the sensor in order to receive a signal relative to the mechanical strain applied to the supporting and movement means and configured to elaborate a signal representing the mechanical strain applied to the bead.

The loads applied to the tyre bead during mounting and removal can be measured in a particularly reliable and precise manner.

This makes it possible to generate a feedback signal when the measured strain reaches a predetermined reference value, said signal enabling the operator to promptly interrupt the mounting or removal process before damage is done to the tyre bead or at least to realize the risk of damage and thus give the possibility of scrapping a potentially damaged tyre.

Further, the invention allows control (for example, feedback control) on the rotation of the rim and/or on the movement of the mounting/removing tool interacting with the rim to be activated according to the measured values of the mechanical strain applied to the bead itself.

The invention contemplates the use of different sensors for measuring different types of mechanical strain applied to the tyre bead during mounting and removal, coupled to the means for supporting and moving the rim (that is, the wheel) and/or associated with tools for engaging an outer circular edge of a rim so as to be interposed between the edge and a tyre bead during mounting.

Each sensor is suitable for measuring a particular type of mechanical strain applied to the tyre bead.

In light of the above, the invention contemplates the provision of an electronic control unit connected to all the sensors and programmed to process (and potentially monitor) the data received in order to derive parameters especially representative of the actual mechanical stress (i.e. the mechanical strain) the tyre bead is subjected to during its mounting or removal.

The possibility of generating alerting signals or of applying the above mentioned types of control (on the mounting/removing tool that interacts with the bead or on the means that turn the wheel) according to these parameters allows particularly precise and effective monitoring of the mechanical stress the tyre bead is subjected to and also reduces the risk of interrupting or slowing down the mounting or removal process unless strictly necessary.

Indeed, if a measured quantity does not effectively represent the real mechanical stress the bead is subjected to, the risk is that of not noticing real damage done to the tyre or, on the contrary, of taking action in response to presumed tyre damage when in fact the tyre has not been damaged.

BRIEF DESCRIPTION OF THE DRAWINGS

Further features and advantages of the invention are more apparent in the non-limiting description which follows of a preferred but non-exclusive embodiment of an apparatus and method for mounting and removing tyres on and from respective wheel rims, as illustrated in the accompanying drawings, in which.

DESCRIPTION OF THE PREFERRED EMBODIMENTS

With reference to the accompanying drawings, the numeral 1 denotes in its entirety an apparatus for mounting and removing tyres 2 on and from respective wheel rims 3.

The apparatus 1 comprises means 4 for supporting and moving a rim 3, designed to hold the rim 3 to the apparatus 1 and to drive it rotationally about its longitudinal axis.

In light of this, the supporting and movement means 4 comprise a rim 3 rotation member 171 for turning the rim 3 and the tyre 2 about said longitudinal axis.

More in detail, the supporting and movement means 4 comprise a rotary shaft 213 extending (vertically in the example illustrated but horizontally in other possible embodiments) from a base 6 and operatively connected to the rotation member 171 housed in the base 6.

At the top of the shaft 213 there extends a self-centering device 222 in the form of a plate 7 for coupling to a rim 3, designed to anchor the rim 3 (that is, the wheel) to the apparatus 1 and operatively connected to the motor 182 to rotate about an axis of extension of the shaft 213 itself.

The base 6 consists of a frame 192 having a substantially box-like shape to contain the motor 182.

Figure 2:
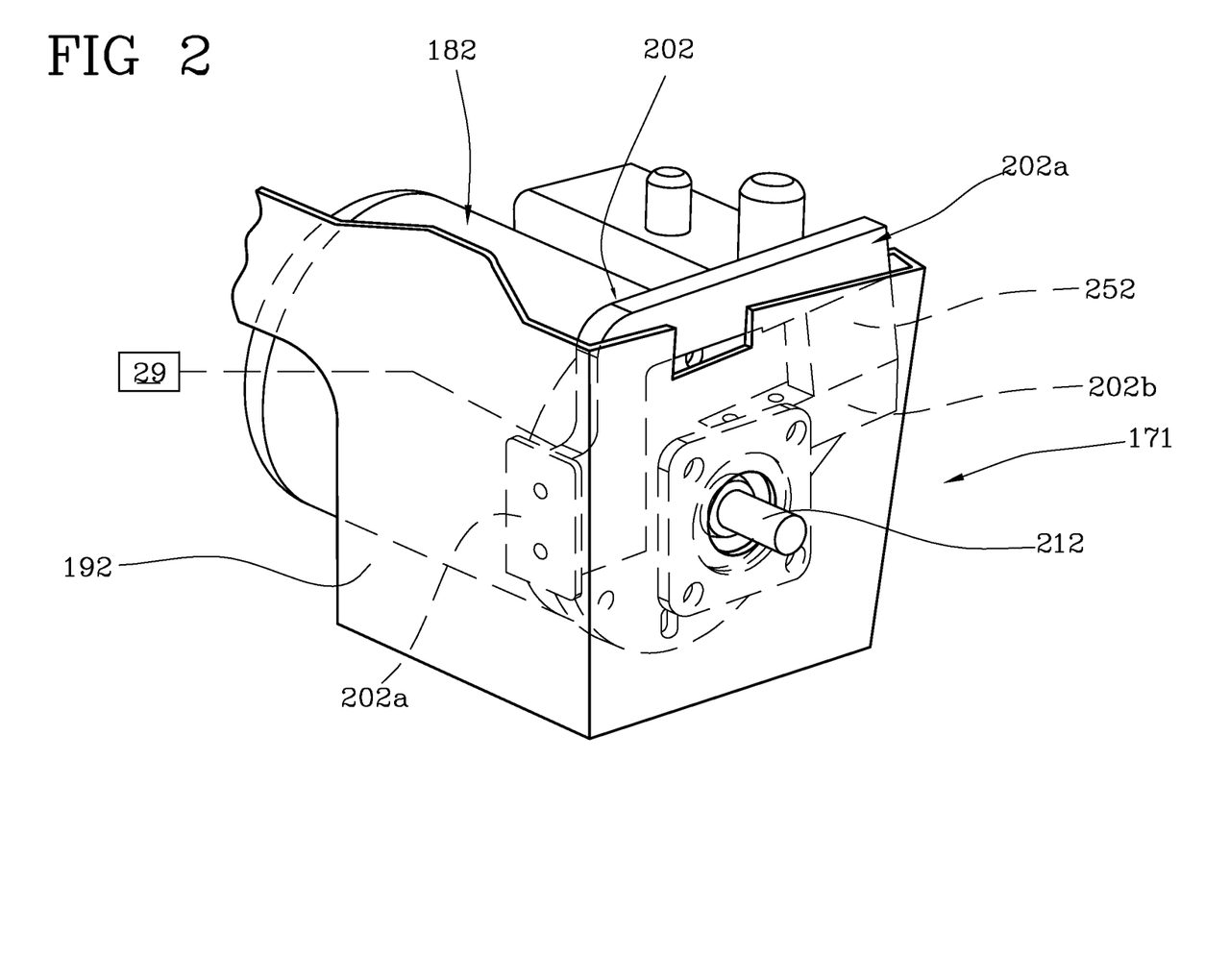
FIG. 2 is an enlarged perspective view of a portion of the apparatus of FIG. 1 showing the means for turning the wheel.

With reference to FIG. 2, the rotation member 171 comprises a motor 182 connected to its rotary shaft 212 in order to drive it rotationally.

Preferably, the motor 182 is movably coupled to the frame 192 so it can move relative to the latter; more specifically, it is mounted in a pendular manner relative to the frame 192.

The rotation member 171 also comprises a supporting flange 202 equipped with a first portion 202a rigidly anchored to the frame 192 and a second portion 202b opposite the first and designed to support the motor 182 in oscillating manner.

That way, the motor 182 can oscillate about a point of connection to the second portion 202b of the flange 202.

Figure 3:
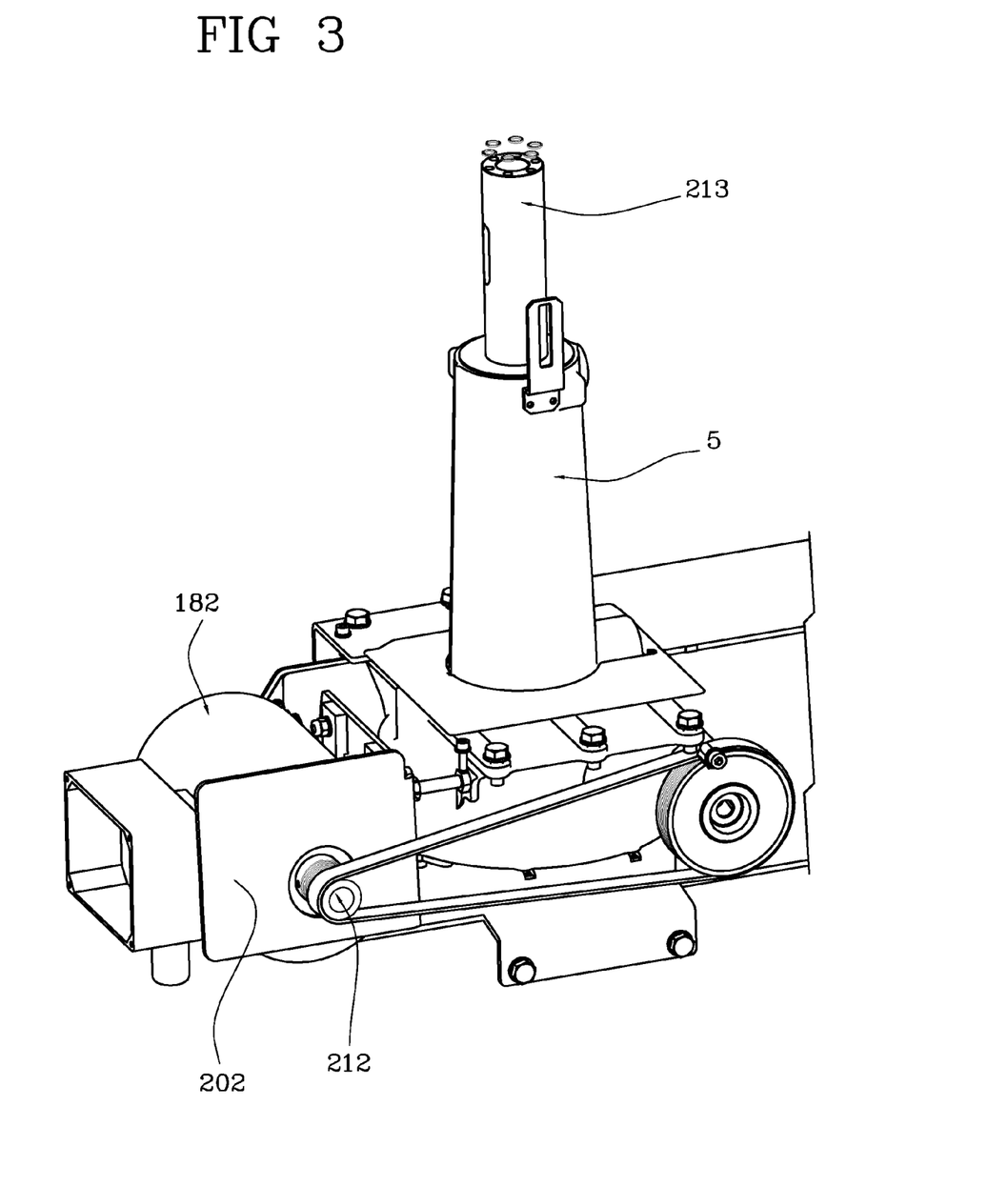
FIG. 3 is an enlarged perspective view of another portion of the apparatus of FIG. 1 showing the means for turning the wheel.

With reference to FIG. 3, it should be noted that preferably the shaft 212 is kinematically coupled (for example by pulleys) to a geared motor; this geared motor (of per se known type) is connected to the shaft 213 to drive it rotationally about the longitudinal axis.

According to the invention, the supporting and movement means 4 comprise (more specifically, the rotation member 171 comprises) a sensor 252 for measuring the mechanical strain applied to the tyre 2 while the latter is being mounted on, and removed from, the rim 3.

More specifically, the rim 3 supporting and movement means 4 comprise the sensor 252, which is designed to measure the mechanical strain applied in forced reaction to the supporting and movement means 4 as a result of the mechanical stress the tyre 2 bead 2a is subjected to during tyre mounting and removal on and from the rim 3.

According to a first aspect of the invention, the sensor 252 is associated with the motor 182 (or rather, to a casing of the motor) in order to measure in particular the tangential strain applied to the tyre 2 bead 2a during tyre mounting and removal on and from the rim 3.

Preferably, the motor 182 is mounted in pendular manner to a frame 192 (or mounted in any other way that enables the motor 182 to oscillate with respect to the frame 192), the sensor 252 being associated with a casing of the motor 182 and with the frame 192 in order to measure the mechanical strain applied to the motor as a result of the mechanical stress the tyre 2 bead 2a is subjected to during mounting/removal of the tyre 2 on and from the rim 3.

More specifically, the supporting means 4 comprise (that is, the rotation member 171 comprises) a flange 202 for supporting the motor 182. Preferably, the sensor 252 is associated with the flange 202.

The flange 202 preferably has a first portion 202a rigidly associated with the frame 192 and a second portion 202b for supporting the motor 182, which supports the motor 182 in such a way that the motor can oscillate, the sensor 252 being interposed between the first portion 202a and the second portion 202b of the flange 202.

Preferably, the sensor 252 is a load cell interposed between the first and the second portion of the flange 202 in order to measure the oscillating movements of the motor 182, corresponding to the strain applied tangentially to the bead 2a of the tyre 2 by the movement element 9 interacting with the bead 2a during removal/mounting of the tyre 2.

Thus, the sensor 252 is operatively associated with a casing of the motor 182 and with the frame 192 to measure the strain applied to the motor as a result of the mechanical stress on the bead 2a of the tyre 2 during mounting/removal of the tyre 2 on/from the rim 3.

In effect, the rotation imparted to the shaft 213 by the motor 182, causes tangential strain to be applied to the tyre 2 due to the retaining action of the bead 2a. In other words, in the process of mounting/removing the tyre 2, the rim 3 is turned and all the stresses on the tyre 2 are transferred to the shaft 213 and thus also to the rotation member 171 as a whole (and to the motor 182 in particular).

Consequently, as the rotation rim 3 and the respective tyre 2 turn, the sensor 252 measures the oscillating movements of the motor 182 due to the mechanical strain applied tangentially to the bead 2a.

For precisely measuring the movements of the motor 182, the sensor 252 is advantageously interposed between the first portion 202a and the second portion 202b of the flange 202.

Preferably, the sensor 252 is a load cell (of per se known type and therefore not described in detail).

Figure 4:
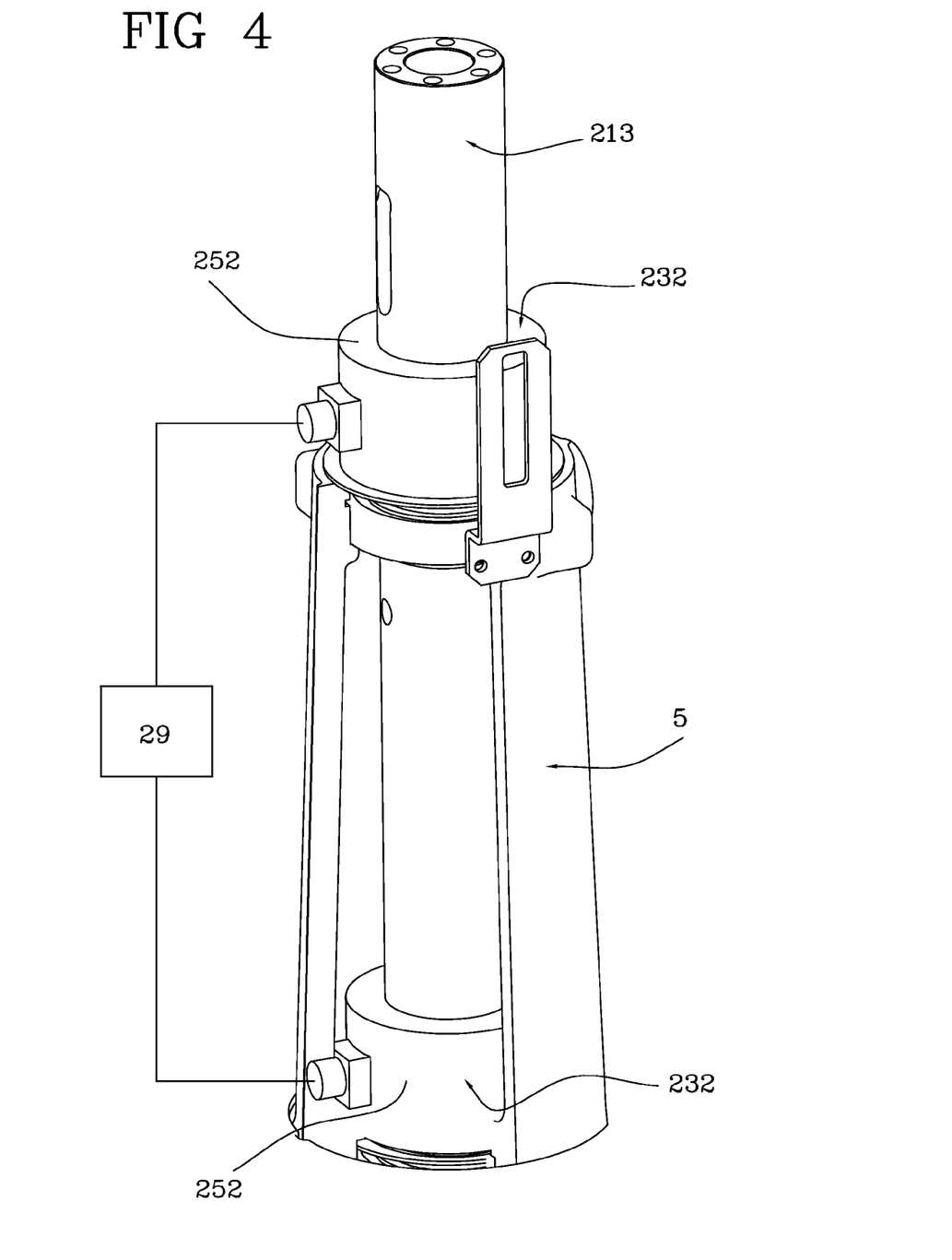
FIG. 4 is an enlarged perspective view of a detail of the portion of the apparatus of FIG. 1 relating to the means for turning the wheel, in a partly open view.

According to another aspect of the invention, the sensor 252 is associated directly with the shaft 213 through a bush 232 associated with the frame 192 and within which the shaft 213 slides (see FIG. 4).

It should be noted that the technical solution just described may be used alternatively, instead of the one described previously (where the sensor 252 is positioned between the motor 182 and the frame 192) or, advantageously, in combination with it.

The bush 232 contains a series of bearings that slide on the rotary shaft 213. Preferably, the apparatus 1 comprises a plurality of sensors 252 operatively coupled to said bearings.

Thus, through the bearings, the sensor 252 measures the forces and moments acting on the shaft 213 and corresponding to the strain on the tyre 2 during mounting/removal of the tyre 2 itself.

The sensors 252 consist preferably of load cells and, more preferably, of multi-axis load cells.

Rising from the base 6 there is a supporting column 8 on which means for moving the tyre and systems for controlling the apparatus 1 are positioned.

In particular, the column 8 supports at least an element 9 for moving a bead 2a of the tyre 2.

More specifically, the tyre 2 has two beads 2a in the form of annular edges forming the ends of the tyre 2.

The movement element 9 operates between the tyre 2 and the rim 3 in order to insert the bead 2a into an annular groove (not illustrated in the accompanying drawings) formed in a cylindrical lateral surface of the rim 3. This is the case when the tyre 2 is mounted on the rim 3.

It should be noted that the movement element 9 is also designed to move the bead 2a away from the rim and/or to hold it away from the same, that is, to place the bead 2a in an extracted position relative to (that is to say, away from) the edge 3a of the rim 3. This is the case when the tyre 2 is removed from the rim 3.

Looking in more detail, the movement element 9 comprises a conveniently power-driven supporting arm 10 extending substantially along a longitudinal axis parallel to the axis of the shaft 213 (vertical in the example illustrated) and positioned at a predetermined distance from the supporting means 4, on the opposite side with respect to the wheel operatively associated with the supporting means 4.

The arm 10 supports a tool 11 designed to operate on the tyre 2 by retaining a part of its bead 2a.

As shown in the accompanying drawings, the tool 11 comprises a hook 12, or a lever 12 or any other element shaped in such a way that it can be interposed between the bead 2a and the rim 3 in order to clutch and extract the bead 2a (when removing) or press it (when mounting). (The element will hereinafter be referred to as lever 12, without thereby limiting the scope of the invention.)

The lever 12 (that is, the tool) is operatively coupled to a respective movement element 13 that moves the lever 12 itself. That way, the lever 12 can be inserted between the tyre 2 and the rim 3 and moved to retain a part of the bead 2a. In other words, the lever 12 acts as a gripper for holding a part of the bead 2a.

Figure 1:
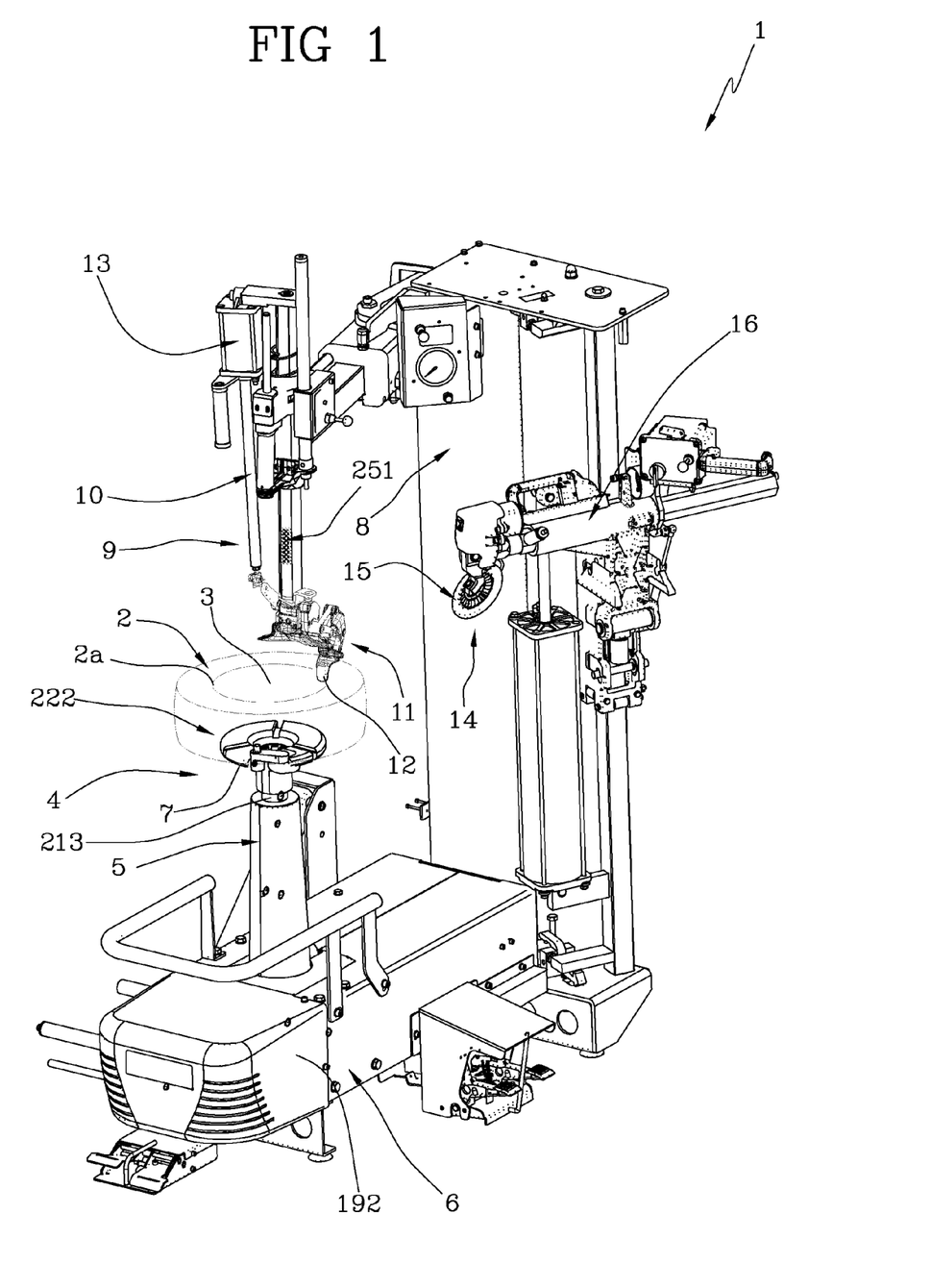
FIG. 1 is a perspective view of an apparatus for mounting and removing tyres on and from respective wheel rims.

Preferably, as better illustrated in FIG. 1, the column 8 also supports a bead loosening tool 14 in the form of a rotatable disc 15 designed to be placed on a sidewall (that is, on a lateral portion) of the tyre 2 in such a way as to press it towards the opposite sidewall.

The rotatable disc 15 is supported by a power-driven arm 16 designed to move the disc 15 to the required position. As the rim 3 and the respective tyre rotate, the disc 15 enables the bead 2a to be pushed into an outer circular edge 3a of the respective rim 3. During tyre removal, the bead loosener 14 is also designed to detach the bead 2a of the tyre 2 from the respective annular groove in the rim 3.

Figure 5:
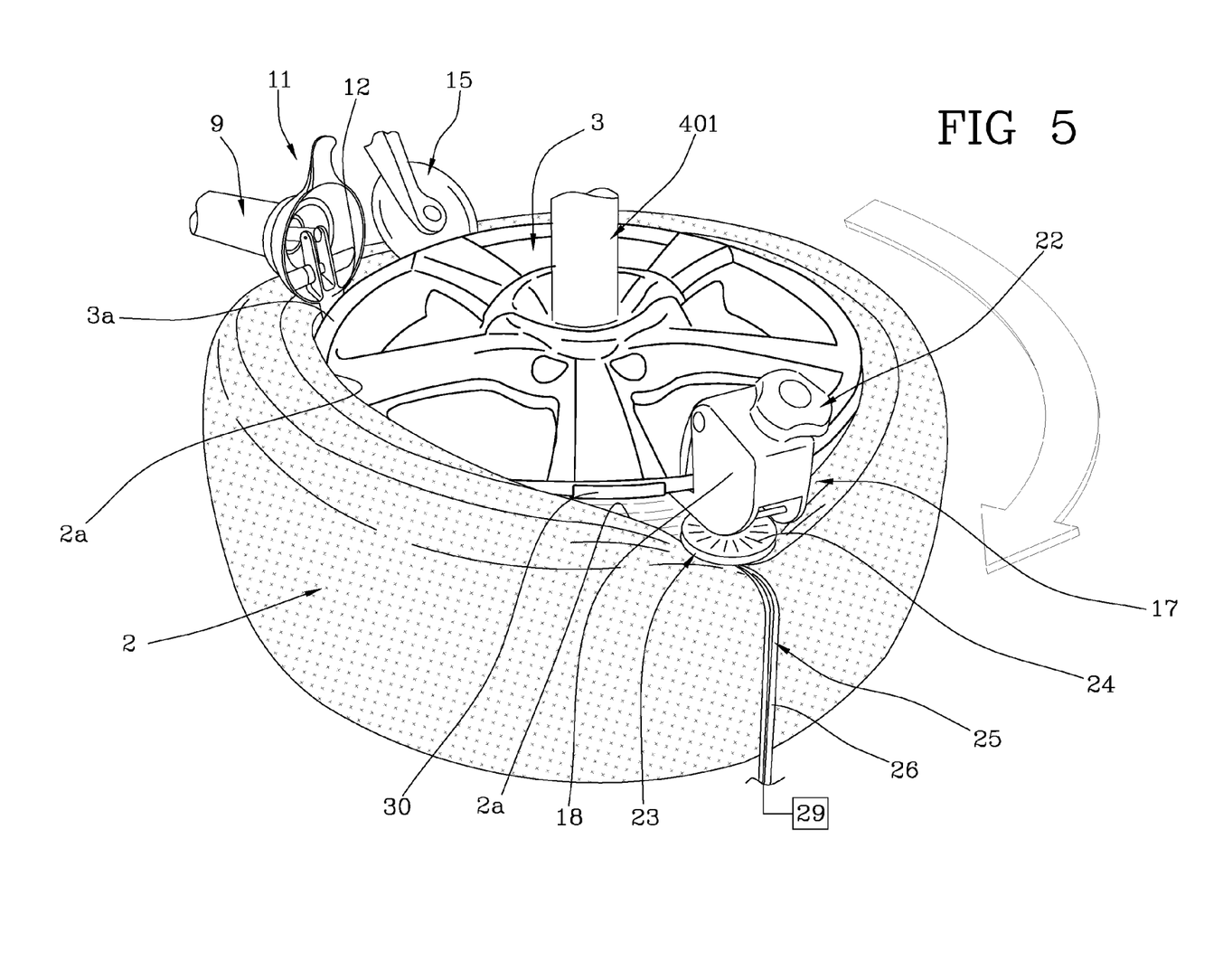
FIG. 5 shows a wheel having applied to it a tool for engaging a rim edge and used in the apparatus of FIG. 1 during the mounting of the tyre.

The apparatus 1 preferably also comprises an electronic control unit 29 (illustrated schematically in FIGS. 4 and 5).

The electronic control unit 29 is connected to the sensor 252 for receiving the data measured by it.

The electronic control unit 29 is programmed to receive and process the data relating to the mechanical strain applied to the bead 2a of the tyre 2 during the latter's mounting on/removal from the rim 3.

Preferably, the electronic processing unit is connected to indicating means adapted to provide the user with a warning signal, for example visual or audible, when the strain value exceeds a predetermined threshold.

Preferably, the electronic unit 29 is programmed to control the bead 2a movement element 9 and/or the rim 3 supporting means 4 according to the data received from the sensor 252. That way, the action on the tyre 2 is constantly monitored, preventing the bead 2a from being excessively deformed and thus avoiding damage to the tyre 2 as a whole.

In particular, the electronic unit 29 is connected to an actuator (not illustrated in the drawings because it is of known type) adapted to move the power-driven arm 10 and/or the lever 12 movement element 13 to drive them according to the signal received from the sensor 252, so that the strain measured by the sensor 252 remains under a predetermined critical value (thanks to a feedback control well known in the field of automatic controls).

Preferably, the electronic unit 29 is connected (in addition to or, alternatively, instead of the actuator) to the motor 182 used to rotationally drive the shaft 212, and hence the shaft 213, in order to drive it according to the signal received from the sensor 252, so that the strain measured by the sensor 252 remains under a predetermined critical value (thanks to a feedback control well known in the field of automatic controls).

In use, for mounting the tyre 2 on the rim 3, the rim 3 is first placed on the rotatable mounting means 4. Next, the tyre 2 is placed on the rim 3 and a first bead 2a is inserted into the annular groove of the rim 3.

At this point, the movement element 9 is used to engage a first portion of the lateral bead 2a and to bend it past the edge 3a of the rim 3 so as to move the portion closer to the annular groove.

An engagement tool (not illustrated since it is of known type) can now also be coupled to the circular edge 3a of the rim 3 to hold the tyre 2 bead 2a in place.

That way, the rim 3 and the tyre 2 coupled to it can then be turned, making the movement element 9 (in particular the lever 12) slide along the bead 2a. This rotational movement progressively forces the entire bead 2a into the annular groove of the rim 3.

As the rim turns, the bead undergoes deformation and therefore the loads acting on the tyre bead 2a are measured by the sensor 252 through the oscillation of the motor 182.

In effect, the mechanical strain applied to the tyre 2 in the zone of the bead 2a in contact with the lever 12 are transferred to the shaft 213 and constantly measured by the sensor 252.

It should be noted that the sensor 252 measures the strain on the tyre 2 during the entire step of turning the rim 3 while the bead 2a moves progressively into the annular groove.

Thus, the sensor 252 sends to the electronic processing unit 29 a plurality of signals representing the mechanical strain. Advantageously, the unit 29 controls, according to these signals, the step of inserting the bead 2a and the step of turning the rim 3.

This invention therefore also provides a method for mounting a tyre 2 on a respective rim 3, comprising the following steps:
positioning the rim 3 on rotatable supporting means 4;
positioning the tyre 2 on the rim 3;
inserting, by means of a movement element 9, at least a first portion of a tyre 2 bead 2a into an annular groove formed in a cylindrical lateral surface of the rim 3;
turning the rim 3 and the bead 2a in such a way that the movement element 9 slides over the bead 2a in order to insert the bead 2a itself into the annular groove;

measuring the mechanical strain applied to the bead 2a of the tyre 2.

Preferably, the mechanical strain applied to the tyre 2 is measured by means of a measuring sensor 252 associated with the rotation member 171.

Further, the mechanical strain applied to the tyre 2 is measured during the entire duration of the step of turning the rim 3, in order to monitor the strain applied to the tyre 2 bead 2a as the bead 2a is progressively inserted into the annular groove.

Preferably, measuring the mechanical strain applied to the tyre 2 comprises the following sub-steps:

sending a signal representing the mechanical strain to an electronic processing unit 29;

controlling the step of inserting the bead 2a and/or the step of turning the rim 3 in such a way that the mechanical strain does not exceed a reference value, driving means for moving a bead 2a movement element 9 and/or a rim 3 supporting shaft 213, respectively, according to said signal.

This invention also provides a method for removing a tyre 2 from a respective rim 3, comprising the following steps:

positioning the rim 3 with the tyre 2 on it on rotatable supporting means 4;

extracting, by means of a movement element 9, at least a first portion of a tyre 2 bead 2a from an annular groove formed in a cylindrical lateral surface of the rim 3;

turning the rim 3 and the bead 2a in such a way that the movement element 9 slides over the bead 2a in order to extract the bead 2a itself from the annular groove;

measuring the mechanical strain applied to the bead 2a of the tyre 2.

Preferably, the mechanical strain applied to the tyre 2 is measured by means of a measuring sensor 252 associated with the rotation member 171.

Further, the mechanical strain applied to the tyre 2 is measured during the entire duration of the step of turning the rim 3, in order to monitor the strain applied to the tyre 2 bead 2a as the bead 2a is progressively extracted from the annular groove.

Preferably, measuring the mechanical strain applied to the tyre 2 comprises the following sub-steps:

sending a signal representing the mechanical strain to an electronic processing unit 29;

controlling the step of extracting the bead 2a and/or the step of turning the rim 3 in such a way that the mechanical strain does not exceed a reference value, driving means for moving a bead 2a movement element 9 and/or a rim 3 supporting shaft 213, respectively, according to said signal.

Advantageously, the sensor 252 directly associated with the bead 2a measures the loads applied to the tyre 2 accurately and continuously.

Indeed, the sensor 252 can measure the mechanical strain applied directly to the tyre 2 bead 2a while it is being turned in order to mount it on, or extract it from, the rim 3. This advantage is possible thanks to the position of the sensor 252, which measures the tangential strain transferred to the motor 182.

As a result, the information collected is complete and refers to the tangential strain the bead 2a of the tyre 2 is subjected to.

Further, the structure of the entire apparatus 1 and of the means for measuring the loads on the tyre 2 are particularly simple, practical and economical.

According to another aspect of this invention, a sensor 251 designed to measure the mechanical strain applied to the tyre bead by the tool 11 is associated with the above mentioned bead 2a movement element 9.

In light of this, the apparatus 1 (for mounting and/or removing the tyre) comprises the sensor 251 (in turn preferably comprising a plurality of sensors, such as extensometers for example) coupled to the arm 10 of the movement element 9.

In this case, extensometers coupled to the outside surface of the arm 10 are preferably used.

Preferably, the sensors 251 (for example, extensometers) are positioned on the outside surface at equal angular intervals; more preferably, there are three extensometers equally spaced from each other.

In light of this, the arm 10 preferably comprises a rod-shaped element whose cross section has the shape of a polygon (preferably regular) with at least three sides; more preferably, the polygon has an even number of sides; more preferably still, the polygon has at least two pairs of parallel sides.

It should be noted that the sensors 251 might also be positioned on a portion of the arm 10 whose cross section has any shape, for example circular.

It is stressed that the fact that the tool supporting arm 10 is equipped with the sensors 251 means that it can advantageously be used on both a tyre mounting machine and on a tyre removing machine; in the example illustrated, the apparatus can be used to both mount and remove the tyre.

Thus, the method according to the invention also comprises the further step of measuring mechanical strain applied, when the movement element 9 operates on the tyre 2 bead 2a, by a tool 11 of the movement element 9 to the tyre 2 bead (2a), using a sensor 251 coupled to an arm 10 of the movement element 9.

According to another aspect of this invention, the apparatus 1 also comprises an engagement tool 17 that can be associated with the outer circular edge 3a of the rim 3 so as to be interposed between the edge 3a and the bead 2a of the tyre 2 when the tyre 2 is being mounted.

In light of this, the apparatus 1 comprises a sensor 25 associated with the engagement tool 17 designed to measure the mechanical strain applied by the engagement tool 17 to the bead 2a of the tyre 2 while the latter is being mounted on the rim 3.

Thus, the method according to the invention also comprises the following further steps:

associating an engagement tool 17 with a circular outside edge 3a of the rim 3 in such a way that at least a portion of the engagement tool 17 is interposed between the edge 3a and at least a portion of the tyre 2 when the tyre 2 is being mounted;

measuring the mechanical strain applied to the bead 2a of the tyre 2 by the engagement tool 17, using a sensor applied to the engagement tool 17.

Two types of engagement tool 17 are contemplated, advantageously applicable jointly to the rim 3 when the tyre 2 is mounted.

The first type of engagement tool 17 (illustrated in FIG. 5) comprises a main body 18 having a clamp that can be engaged with the edge 3a of the rim 3 in a zone where the bead 2a is operatively positioned at an annular groove in the rim, the sensor 25 being associated with the clamp.

Figure 6:
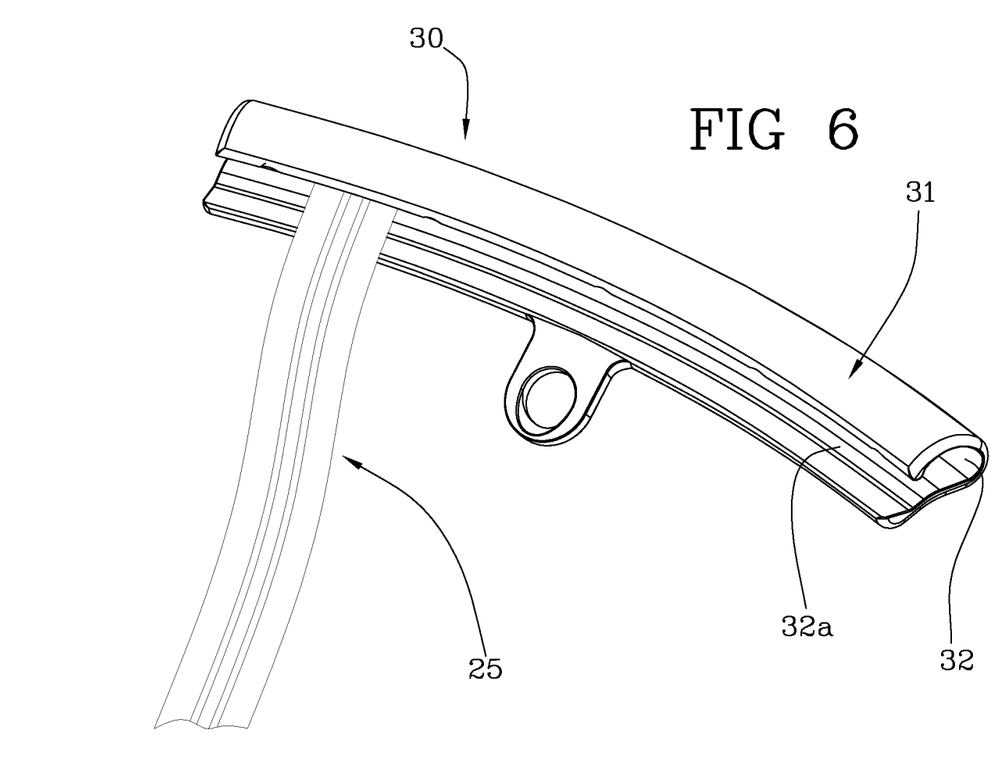
FIG. 6 illustrates a tool like the one of FIG. 1 for engaging a rim edge, according to another embodiment.

The second type of engagement tool 30 (illustrated in FIGS. 5 and 6) comprises an elastic element 31 having an arcuate profile and forming a cavity 32 that fits an arcuate portion of the edge 3a of the rim 3, the sensor 25 being coupled to a zone of the elastic element 31 that is operatively interposed between the bead 2a and the edge 3a of the rim 3, when the tool 30 is coupled to the rim 3.

Preferably, the electronic processing unit 29 is connected to the sensors 25 and, where present, also to the sensors 251 and, where present, also to the sensors 252 described above.

In light of this, the electronic processing unit 29 is programmed to receive signals from two or more sensors (any combination of the sensors 25, 251 and 252) to process the information captured by the sensors and derive the reference parameter values.

These reference parameters are used to obtain an optimized representation of the mechanical strain applied to the bead during tyre mounting and removal.

Advantageously, the sensor 251 directly associated with the bead 2a measures the loads applied to the tyre 2 accurately and continuously.

Indeed, the sensor 251 can measure the mechanical strain applied directly to the tyre 2 bead 2a while it is being deformed in order to mount it on, or extract it from, the rim 3. This advantage is possible thanks to the position of the extensometers 251a, which measure the strain on the bar 10a that may be bending, pulling, compressional and torsional strain.

As consequence, the information gathered (detected) are particularly complete and are pertinent to axial stresses, radial stresses, tangential stresses to which the bead of tyre is subjected.

Further, the structure of the entire apparatus 1 and of the means for measuring the loads on the tyre 2 are particularly simple, practical and economical.

Another advantage of the invention is that it provides an apparatus and a method for mounting and removing tyres that makes it possible to measure all types of mechanical strain applied to the tyre bead (during both mounting and removal of the tyre).

This result is obtained also thanks to the presence of the sensors coupled to different parts of the apparatus.

Thus, the invention contemplates the use of sensors 25 in the engagement tools 17 (also, two or more of these accessories, preferably of different types, that is to say, one equipped with a clamp and another equipped with an elastic element 31, may be used simultaneously).

These engagement tools 17 equipped with pressure sensors 25 are particularly suitable for measuring radial strain (especially the engagement tool 17 with the elastic element 31) and axial strain especially the engagement tool 17 with the clamp).

The invention also contemplates the use of sensors 251 associated with the arm 10 that supports the mounting/removing tool 11.

The sensors 251 are particularly suitable for measuring the bending, pulling and compressional strain, as well as torsional strain applied to the arm.

Therefore, the sensors 251 make it possible to obtain information about all the types of strain (axial, radial and tangential) from the measured strain values using appropriate calculations.

The invention also contemplates the use of sensors 252 associated with the means 4 for supporting (and moving) the rim.

The sensors 252 are particularly suitable for measuring the tangential and axial strain on the bead. In light of this, the integrated use of the different sensors 25, 251 and 252 is particularly advantageous.

Hence, the present invention makes available an engagement tool 17 that can be associated with an outer circular edge 3a of a wheel rim 3 so as to be interposed between the edge 3a and a bead 2a of a tyre 2 of the wheel in an apparatus 1 for mounting the tyre on the respective wheel rim, said engagement tool 17 for engaging the edge 3a of the rim 3 comprises a sensor 25 designed to measure the mechanical strain applied to the tyre 2 by the engagement tool 17 while the tyre 2 is being mounted on the rim 3.

Furthermore, the present invention makes available an apparatus 1 for mounting and removing a tyre 2 on and from a respective rim 3, comprising:

an element 9 for moving a bead 2a of the tyre 2 in order to insert/remove the bead 2a into/from a respective groove in the rim 3, the element 9 comprising a tool 11 connected to a respective supporting arm 10 for moving the bead 2a;

means 4 for supporting and moving the rim 3, rotatable in such manner as to turn the rim 3 and the tyre 2 about a corresponding longitudinal axis of the rim 3;

a sensor 251 associated with the supporting arm 10 for measuring the mechanical strain applied to the bead 2a of the tyre 2 when the latter is mounted on, and removed from, the rim 3.

What is claimed is:

1. An apparatus for mounting and removing a tyre on and from a respective rim, comprising:
    a movement element for moving a bead of the tyre in order to insert/remove the bead into/from a respective groove in the rim;
    means for supporting and moving the rim, designed to rotationally drive the rim about its longitudinal axis;
    said means for supporting and moving the rim comprising:
    a rotary shaft for turning the rim and the tyre about said longitudinal axis;
    a motor connected to the rotary shaft to drive it rotationally, wherein the rim supporting and movement means further comprise a force sensor for measuring the mechanical strain applied to the supporting and movement means as a result of the mechanical stress the tyre bead is subjected to during tyre mounting and removal on and from the rim; and said sensor being configured to make available a signal representing the mechanical strain applied to the tyre bead during tyre mounting and removal on and from the rim, wherein the force sensor is connected to the motor or to a casing of the motor, or to a flange provided for supporting the motor.

2. The apparatus according to claim 1, comprising an electronic control unit connected at least to the sensor in order to receive a signal relative to the mechanical strain applied to the supporting and movement means and configured to elaborate a signal representing the mechanical strain applied to the bead.

3. The apparatus according to claim 1, wherein the rim supporting and movement means comprise the motor mounted in pendular manner to a frame of the apparatus, said sensor being associated with a casing of the motor and with the frame in order to measure the strain applied to the motor as a result of the mechanical stress the tyre bead is subjected to during mounting/removal of the tyre on and from the rim.

4. The apparatus according to claim 3, wherein the supporting means comprise a flange for supporting the motor and having a first portion rigidly associated with the frame and a second portion for supporting the motor, which supports the motor in such a way that the motor can oscillate, the sensor being interposed between the first portion and the second portion of the flange.

5. The apparatus according to claim 4, wherein the sensor comprises a load cell interposed between the first and the second portion of the flange in order to measure the oscillating movements of the motor corresponding to the strain applied tangentially to the bead of the tyre by the movement element interacting with the bead during removal/mounting of the tyre.

6. The apparatus according to claim 1, wherein the rim supporting and movement means comprise a shaft kinematically connected to a motor and having one end associated with a centering device adapted to support the rim, the sensor being coupled to the shaft in order to measure bending strain applied to the shaft in reaction to the mechanical stress the tyre bead is subjected to during mounting/removal of the tyre itself on and from the rim.

7. The apparatus according to claim 6, wherein the shaft rotates within at least one bush associated with a frame of the apparatus, the sensor being positioned in the bush in order to measure the oscillating movements of the shaft, corresponding to the strain the tyre is subjected to during removal/mounting of the tyre itself.

8. The apparatus according to claim 7, wherein the at least one bush comprises a plurality of bearings that slide on the rotary shaft, said bearings being operatively coupled to the sensor.

9. The apparatus according to claim 1, wherein the sensor comprises a load cell.

10. The apparatus according to claim 1, wherein the movement element has an arm for supporting a tool operating on the bead in order to insert/extract it into/from the groove in the rim, the apparatus comprising at least one sensor associated with the arm in order to measure mechanical strain applied by the tool to the bead of the tyre during mounting and removal of the latter.

11. The apparatus according to claim 1, comprising:
an engagement tool that can be associated with an outer circular edge of the rim so as to be interposed between the edge and the bead of the tyre while the tyre is being mounted;
a sensor associated with the engagement tool and designed to measure the mechanical strain applied by the engagement tool to the bead of the tyre while the latter is being mounted on the rim.

12. The apparatus according to claim 2, wherein the electronic control unit is programmed to process the signal and provide a user of the apparatus with an indication as to the mechanical strain the bead is subjected to.

13. The apparatus according to claim 2, wherein the electronic control unit is programmed to process the signal and drive the bead movement element and/or the rim supporting means according to the data measured by the sensor.

14. An apparatus for mounting and removing a tyre on and from a respective rim, comprising:
a movement element for moving a bead of the tyre in order to insert/remove the bead into/from a respective groove in the rim;
means for supporting and moving the rim, designed to rotationally drive the rim about its longitudinal axis;
wherein the rim supporting and movement means comprise a sensor for measuring the mechanical strain applied to the supporting and movement means as a result of the mechanical stress the tyre bead is subjected to during tyre mounting and removal on and from the rim; said sensor being configured to make available a signal representing the mechanical strain applied to the tyre bead during tyre mounting and removal on and from the rim,
wherein the rim supporting and movement means comprise a motor mounted in pendular manner to a frame of the apparatus, said sensor being connected to a casing of the motor and to the frame in order to measure the strain applied to the motor as a result of the mechanical stress the tyre bead is subjected to during mounting/removal of the tyre on and from the rim.

15. An apparatus for mounting and removing a tyre on and from a respective rim, comprising:
a movement element for moving a bead of the tyre in order to insert/remove the bead into/from a respective groove in the rim;
means for supporting and moving the rim, designed to rotationally drive the rim about its longitudinal axis;
said means for supporting and moving the rim comprising:
a rotary shaft for turning the rim and the tyre about said longitudinal axis;
a motor connected to the rotary shaft to drive it rotationally, wherein the rim supporting and movement means further comprise a force sensor for measuring the mechanical strain applied to the supporting and movement means as a result of the mechanical stress the tyre bead is subjected to during tyre mounting and removal on and from the rim; and
said sensor being configured to make available a signal representing the mechanical strain applied to the tyre bead during tyre mounting and removal on and from the rim, wherein the force sensor is coupled to the shaft.

* * * * *